United States Patent [19]
Suzuki

[11] Patent Number: 5,566,154
[45] Date of Patent: Oct. 15, 1996

[54] DIGITAL SIGNAL PROCESSING APPARATUS, DIGITAL SIGNAL PROCESSING METHOD AND DATA RECORDING MEDIUM

[75] Inventor: Hiroshi Suzuki, Saitama, Japan

[73] Assignee: Sony Corporation, Tokyo, Japan

[21] Appl. No.: 446,639

[22] PCT Filed: Oct. 11, 1994

[86] PCT No.: PCT/JP94/01696

§ 371 Date: May 25, 1995

§ 102(e) Date: May 25, 1995

[87] PCT Pub. No.: WO95/10886

PCT Pub. Date: Apr. 20, 1995

[30] Foreign Application Priority Data

Oct. 8, 1993 [JP] Japan ...................................... 5-253460

[51] Int. Cl.$^6$ .................................. H04N 5/76; G10L 3/02
[52] U.S. Cl. .............................................. 369/59; 395/2.38
[58] Field of Search .................................. 369/59, 60, 47, 369/48; 360/48, 51, 39, 36.1, 36.2; 395/2.1, 2.38, 2.39; 358/432

[56] References Cited

U.S. PATENT DOCUMENTS 5,293,252 3/1994 Kim et al. .................................. 358/432
5,471,558 11/1995 Tsutsui .................................. 395/2.38 X

FOREIGN PATENT DOCUMENTS 63-110830 6/1988 Japan .............................. H04B 14/06
5-206866 8/1993 Japan .............................. H03M 7/30
6-149292 5/1994 Japan .............................. G01L 9/08

Primary Examiner—Georgia Y. Epps
Assistant Examiner—P. W. Huber
Attorney, Agent, or Firm—Limbach & Limbach

[57] ABSTRACT

This invention employs a scheme to extract, from components within a plurality of blocks obtained by subdividing an input signal with respect to time and frequency, every respective blocks, a component or plural components in order of magnitude of components within the respective blocks to determine, on the basis of a difference between magnitudes of components of respective blocks except for the extracted components and magnitudes of the extracted components, a bit allocation ratio to the respective blocks to quantize components of respective blocks on the basis of the bit allocation ratio thus to generate compressed data, thereby making it possible to realize a technique of allocation of bits desirable also from a viewpoint of the auditory sense with respect to such an input signal including, e.g., overtone to much degree. Accordingly, it is possible to carry out efficient compression/expansion of high sound quality from a viewpoint of the hearing sense. In addition, data recording medium adapted for recording therein data compressed by the digital signal processing apparatus of this invention can more effectively utilize memory capacity as compared to the conventional data recording medium.

12 Claims, 11 Drawing Sheets

5,566,154

DIGITAL SIGNAL PROCESSING APPARATUS, DIGITAL SIGNAL PROCESSING METHOD AND DATA RECORDING MEDIUM

DESCRIPTION

1. Technical Field

This invention relates to a recording/reproduction of compressed data in which digital audio signals, etc. are caused to undergo bit compression, a recording medium adapted so that those compressed data are recorded therein, and a transmission system for compressed data, and more particularly to a digital signal processing apparatus, a digital signal processing method and a data recording medium, which are suitable when used in the case of carrying out, in dependency upon amplitude change of a waveform on the time base of an input signal, information compression of such a digital signal to vary size in point of time (length) of a block subject to processing thereof to conduct recording or transmission and/or reproduction or reception of such a compressed digital signal to expand it.

2. Background Art

The applicant of this application has already proposed, e.g., in the Japanese Patent Application Laid Open No. 105269/1992, the Japanese Patent Application Laid Open No. 105270/1992, the Japanese Patent Application Laid Open No. 105271/1992, and the Japanese Patent Application Laid Open No. 6572/1993 of the Japanese Laid Open Patent Publications, etc., such a technology to implement bit compression to an inputted digital audio signal to record them in a burst manner with a predetermined data quantity being as a recording unit.

This technology is a technology using a magneto-optical disc as a recording medium and adapted for recording/reproducing AD (Adaptive Difference) PCM audio data standardized by the audio data format of so called CD-I (CD-Interactive), CD-ROM XA, wherein such audio data are recorded onto the magneto-optical disc in a burst manner with, e.g., 32 sectors of the ADPCM data and several linking sectors for interleaving processing being as a recording unit.

In the case of such ADPCM audio data in a recording/reproducing apparatus using a magneto-optical disc, several modes can be selected. For example, there are prescribed (provided), e.g., level A where compression rate is 2 when viewed from comparison with reproduction time of the ordinary CD and sampling frequency is 37.8 kHz, level B where compression rate is 4 when similarly viewed and sampling frequency is 37.8 kHz, and level C where compression rate is 8 when similarly viewed and sampling frequency is 18.9 kHz. Namely, for example, in the case of the level B, digital audio data is compressed into substantially one fourth (¼), and reproduction time (play time) of the disc recorded in the mode of the level B becomes equal to a value four times greater than that in the case of the standard CD format (CD-DA format). This permits the apparatus to become compact because recording/reproducing time which is the same order as that of the more compact standard 12 cm disc can be obtained.

In this instance, since rotation speed of the disc is the same as that of the standard CD, compressed data corresponding to reproduction time four times greater than that of the standard CD per a predetermined time will be obtained, e.g., in the case of the level B. For this reason, an approach is employed to read out four times, in a overlapping manner, the same compressed data in time units, e.g., sector or cluster, etc. to use, for reproduction of audio data, only data of one read-out operation thereof. In actual terms, in scanning (tracking) recording tracks in a spiral form, such a track jump to return to the original track position every one rotation is carried out to successively conduct reproducing operation in such a form to carry out tracking of the same track repeatedly by four times. This means that it is sufficient that normal (correct) compressed data can be obtained by at least only one read operation of, e.g., four times of overlapping (repetitive) read operations. Employment of such an approach is tolerant of error by disturbance, etc. and is preferable particularly when applied to portable compact (small-sized) equipments.

Further, the applicant of this application has proposed, in the Japanese Patent Application Laid Open No. 206866/1993 of the Japanese Laid Open Patent Publication, a bit allocation technique for efficiently realizing satisfactory compression. In this technology, in allocation of bits, bit allocation dependent upon magnitudes of signals within respective small blocks such as so called critical bands, etc. is carried out while implementing weighting in accordance with corresponding bands of the small blocks. According to this technology, in the case where extreme unevenness does not take place in magnitude of spectrum components within respective small blocks, compression can be satisfactorily carried out.

However, in the case where extreme unevenness or conspicuous peak component is included in magnitudes of spectrum components within respective small blocks, in other words, in the case where sound to be masked is tone-shaped, or in the case of small blocks where there is no extreme unevenness in magnitudes of signals (signal components) within respective small blocks indicating values similar to values when magnitudes of signals within respective small blocks are determined by values which take the maximum values within respective small blocks or sum total values or mean values of magnitudes of signals within respective small blocks, sound to be masked can not be distinct from a noise-shaped signal within small block. Thus, there may occur instances where satisfactory result cannot be obtained even with the above-described technology. This results from the fact that when the masking effect is taken into consideration, degree of the effect varies in dependency upon the property of sound to be masked, i.e., whether that sound is noise-shaped or tone-shaped.

Accordingly, with the above-described technology, in the above-mentioned case, a greater number of bits are required, i.e., bit allocation caused to be in correspondence with a small block where a tone-shaped signal is sound to be masked must be employed. As a result, excess bits would be allocated to a small block where a masked sound is noise-shaped, in which it is sufficient to implement allocation of a lesser number of bits is noise-shaped, giving rise to instances where efficiency in compression may be lowered.

Thus, this invention has been made in view of such actual circumstances, and its object is to provide a digital signal processing apparatus, etc. to which a technique of bit allocation caused to be in correspondence with the property of sound to be masked is applied.

DISCLOSURE OF THE INVENTION

This invention has been proposed in order to attain the above-described object, and a first digital signal processing apparatus according to this invention is directed to a digital signal processing apparatus adapted for compressing a digital signal to record or transmit it, characterized in that the apparatus comprises: extracting means for extracting, from components within a plurality of blocks obtained by subdividing an input signal with respect to time and frequency, every respective blocks, a component or plural components in order of magnitude of the components within each of the blocks; bit allocating means for determining, on the basis of a difference between magnitudes of components of the respective blocks except for the extracted components and magnitudes of the extracted components, a bit allocation ratio to the respective blocks; and encoding means for quantizing components of the respective blocks on the basis of the bit allocation ratio to generate compressed data.

Moreover, a second digital signal processing apparatus according to this invention is characterized in that, in the first digital signal processing apparatus, the encoding means normalizes components within the respective blocks by representative values within the respective blocks.

Further, a third digital signal processing apparatus according to this invention is characterized in that, in the first digital signal processing apparatus, the bit allocating means further determines the bit allocation ratio on the basis of magnitudes of components within the respective blocks and so that weighting is carried out in accordance with corresponding bands of the respective blocks.

In addition, a fourth digital signal processing apparatus according to this invention is characterized in that, in the first digital signal processing apparatus, the extracting means switches the number of the extracted components in accordance with corresponding bands of the respective blocks.

A first digital signal processing method according to this invention is directed to a digital signal processing method of compressing a digital signal to record or transmit it, characterized in that the method comprising the steps of: extracting, from components within a plurality of blocks obtained by subdividing an input signal with respect to time and frequency, every respective blocks, a component or plural components in order of magnitude of components within each of the blocks; determining, on the basis of a difference between magnitudes of components of the respective blocks except for the extracted components and magnitudes of the extracted components, a bit allocation ratio to the respective blocks; and quantizing components of the respective blocks on the basis of the bit allocation ratio to generate compressed data.

Moreover, a second digital signal processing method according to this invention is characterized in that, in the first digital signal processing method, the method further includes a step of normalizing components within the respective blocks by representative values within the respective blocks.

Further, a third digital signal processing method according to this invention is characterized in that, in the first signal processing method, the method comprises a step of determining the bit allocation ratio on the basis of magnitudes of components of the respective blocks and so that weighting is carried out in accordance with corresponding bands of the respective blocks.

In addition, a fourth signal processing method according to this invention is characterized in that, in the first digital signal processing method, the number of the extracted components is switched in accordance with corresponding bands of the respective blocks.

A first data recording medium according to this invention is directed to a data recording medium adapted so that compressed data are recorded therein, characterized in that the data recording medium is formed by the steps of: extracting, from components within a plurality of blocks obtained by subdividing an input signal with respect to time and frequency, every respective blocks, a component or plural components in order of magnitude of components within each of the blocks; determining a bit allocation ratio to the respective blocks on the basis of a difference between magnitudes of components of the respective blocks except for the extracted components and magnitudes of the extracted components; quantizing components of the respective blocks on the basis of the bit allocation ratio to generate compressed data; and recording the compressed data onto or into the recording medium.

Moreover, a second data recording medium according to this invention is characterized in that, in the first data recording medium, the data recording medium is formed by further including a step of normalizing components within the respective blocks by representative values within the respective blocks.

Further, a third data recording medium according to this invention is characterized in that, in the first data recording medium, the data recording medium is formed by further including a step of determining the bit allocation ratio on the basis of magnitudes of components of the respective blocks and so that weighting is carried out in accordance with corresponding bands of the respective blocks.

In addition, a fourth data recording medium according to this invention is characterized in that, in the first data recording medium, the data recording medium is formed by further including a step of switching the number of the extracted components.

Namely, this invention employs a scheme to extract, from components within a plurality of blocks obtained by subdividing an input signal with respect to time and frequency, every respective blocks, a component or components in order of magnitude of the components within each of the blocks to determine a bit allocation ratio to the respective blocks on the basis of a difference between magnitudes of components of the respective blocks except for the extracted components and magnitudes of the extracted components to quantize components of the respective blocks on the basis of the bit allocation ratio to generate compressed data, thereby making it possible to prevent lowering of efficiency of compression. Thus, it becomes possible to obtain a more satisfactory sound quality at the same bit rate, and it becomes possible to realize recording/transmission, etc. at a lower bit rate with respect to the same sound quality.

BEST MODE FOR CARRYING OUT THE INVENTION

Figure 1:
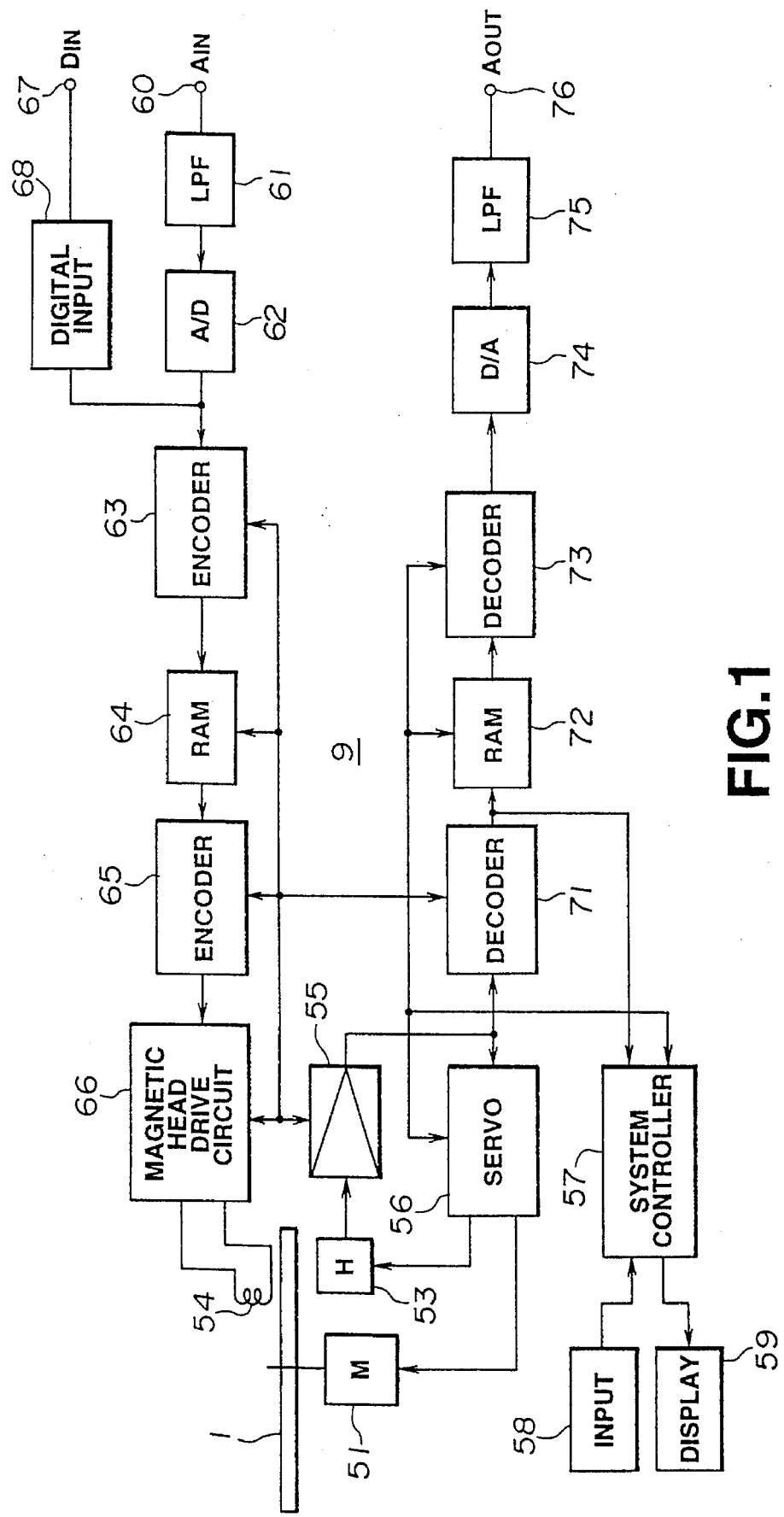
FIG. 1 is a block circuit diagram showing an example of the configuration of a recording/reproducing apparatus (disc recording/reproducing apparatus) for compressed data as an embodiment of a digital signal processing apparatus according to this invention.

Initially, FIG. 1 is a block circuit diagram showing outline of the configuration of an embodiment of a digital signal processing apparatus (compressed data recording and/or reproducing apparatus 9) of this invention.

In the compressed data recording and/or reproducing apparatus 9 shown in FIG. 1, a magneto-optical disc 1 rotationally driven by a spindle motor 51 is used as a recording medium. At the time of recording data with respect to the magneto-optical disc 1, e.g., a modulation magnetic field corresponding to recording data is applied by means of a magnetic head 54 under the state where laser beams are irradiated by an optical head 53 to thereby carry out so called magnetic field modulation recording to record data along recording tracks of the magneto-optical disc 1. On the other hand, at the time of reproduction, recording tracks of the magneto-optical disc i is traced by laser beams by means of the optical head 53 to magneto-optically carry out reproduction.

The optical head 53 comprises, e.g., laser light source such as laser diode, etc., collimator lens, objective (object lens), polarizing beam splitter, optical parts such as cylindrical lens, etc., and photodetector having a light receiving section of a predetermined pattern, etc. This optical head 53 is provided at the position opposite to the magnetic head 54 through the magneto-optical disc 1. At the time of recording data onto the magneto-optical disc 1, the magnetic head 54 is driven by a head drive circuit 66 of the recording system which will be described later to apply modulation magnetic field corresponding to recording data, and to irradiate laser beams onto the target track of the magneto-optical disc i by means of the optical head 53 to thereby carry out thermal magnetic recording by the magnetic field modulation system. Moreover, this optical head 53 detects a reflected light of laser beams irradiated onto the target track to detect focus error, e.g., by so called astigmatism method, and to detect tracking error, e.g., by so called push-pull method. At the time of reproducing data from the magneto-optical disc 1, the optical head 53 detects focus error or tracking error as described above, and detects a difference of polarization angle (Kerr rotational angle) of a reflected light from the target track of laser beams to generate a reproduction signal.

An output of the optical head 53 is delivered to a RF circuit 55. This RF circuit 55 extracts the focus error signal or the tracking error signal from the output of the optical head 53 to deliver it to a servo control circuit 56, and to binarize the reproduction signal (allow the reproduction signal to be a binary signal) to deliver it to a decoder 71 of the reproducing system which will be described later.

The servo control circuit 56 comprises, e.g., focus servo control circuit, tracking servo control circuit, spindle motor servo control circuit, and sled servo control circuit, etc. The focus servo control circuit carries out focus control of the optical system of the optical head 53 so that the focus error signal becomes equal to zero. Moreover, the tracking servo control circuit carries out tracking control of the optical system of the optical head 53 so that the tracking error signal becomes equal to zero. Further, the spindle motor servo control circuit controls the spindle motor 51 so as to rotationally drive the magneto-optical disc 1 at a predetermined rotation velocity (e.g., constant linear velocity). In addition, the sled servo control circuit moves the optical head 53 and the magnetic head 54 to the target track position of the magneto-optical disc 1 designated by a system controller 57. The servo control circuit 56 serving to carry out various control operations as described above sends, to the system controller 57, information indicating operating states of respective components controlled by the servo control circuit A key input operation section 58 and a display section 59 are connected to the system controller 57. This system controller 57 carries out control of the recording system and the reproducing system in an operation mode designated by operation input information from the key input operation section 58. Moreover, the system controller 57 carries out, on the basis of address information of sector unit reproduced by header time or Q data of subcode, etc. from a recording track of the magneto-optical disc 1, management of recording position or reproduction position on the recording track that the optical head 53 and the magnetic head 54 are tracing. Further, the system controller 57 carries out, on the basis of data compression rate and reproduction position information on the recording track, a control to allow the display section 59 to display reproduction time.

With respect to the reproduction time display, address information (absolute time information) of sector unit reproduced by so called header time, or so called subcode Q data, etc. from recording tracks of the magneto-optical disc 1 is multiplied by inverse number of data compression rate (e.g., 4 in the case of ¼ compression) to thereby determine actual time information to allow the display section 59 to display it. It is to be noted that, also at the time of recording, for example, in the case where absolute time information is recorded in advance (pre-formatted) on recording tracks of magneto-optical disc, etc., an approach may be employed to read the pre-formatted absolute time information to multiply it by inverse number of data compression rate to thereby permit a current position to be displayed by an actual recording time.

In the recording system of the recording/reproducing section of the disc recording/reproducing apparatus, an analog audio input signal AIN from an input terminal 60 is delivered to an A/D converter 62 through a low-pass filter 61. This A/D converter 62 quantizes the analog audio input signal AIN. A digital audio signal obtained from the A/D converter 62 is delivered to an ATC (Adaptive Transform Coding) PCM encoder 63. Moreover, a digital audio input signal DIN from an input terminal 67 is delivered to the ATC encoder 63 through a digital input interface circuit 68. The ATC encoder 63 carries out bit compression (data compression) processing with respect to digital audio PCM data of a predetermined transfer rate (speed) obtained by quantizing the input signal AIN by means of the A/D converter 62. While explanation will now be given on the assumption that the compression rate is 4 (magnification), this embodiment employs a configuration which is not dependent on the above-mentioned magnification, and the magnification may be arbitrarily selected depending upon applications.

A memory 64 is adapted so that write and read operations of data are controlled by the system controller 57, and is used as a buffer memory for temporarily storing ATC data delivered from the ATC encoder 63 to record it onto the disc as occasion demands. Namely, with respect to e.g., compressed audio data delivered from the ATC encoder 63, its data transfer rate (speed) is reduced to one fourth (¼) of data transfer rate (75 sectors/sec.) of the standard CD-DA format, i.e., 18.75 sectors/sec. Such compressed data are successively written into the memory 64. For such compressed data (ATC) data, it is sufficient to carry out recording of one sector per four sectors as previously described. However, since recording every four sectors (i.e., every other three sectors) is almost unable to be carried out from a practical point of view, sector continuation recording which will be described later is carried out. This recording is carried out in a burst manner at a data transfer rate (speed) (75 sectors/sec.) which is the same as that of the standard CD-DA format, with cluster comprised of predetermined plural sectors (e.g., 32 sectors+several sectors) being as a recording unit, through idle (interruptive) time period. Namely, from the memory 84, ATC audio data which have been successively written at a low transfer rate of 18.75 (=75/4) sectors/sec. corresponding to the bit compression rate are read out in a burst manner at the 75 sectors/sec. as recording data. While, with respect to the data which are read out and recorded, the entire data transfer rate including the recording idle (interruptive) time period is the low rate of 18.75 sectors/sec., instantaneous data transfer rate within time of the recording operation carried out in a burst manner is the standard 75 sectors/sec. Accordingly, when the disc rotation velocity is the same velocity as the standard CD-DA format (constant linear velocity), recording having the same recording density and memory pattern as those of the CD-DA format will be carried out.

ATC audio data, i.e., recording data which has been read out in a burst manner at the (instantaneous) transfer rate of 75 sectors/sec. from the memory 64 is delivered to an encoder 65. In this instance, in the data train delivered from the memory 64 to the encoder 65, unit where data are continuously recorded by single recording is caused to be a cluster comprised of a plurality of sectors (e.g., 32 sectors) and several sectors for cluster connection allocated at positions before and after the cluster. The length of the cluster connection sector is set to a value longer than the interleaving length at the encoder 65 so that even if data is interleaved, this does not affect data of other clusters.

The encoder 65 implements encoding processing for error correction (addition of parity and interleaving processing) or EFM encoding processing, etc. to the recording data delivered in a burst manner as described above from the memory 64. The recording data to which encoding processing by the encoder 65 has been implemented is delivered to the magnetic head drive circuit 66. To this magnetic head drive circuit 66, the magnetic head 54 is connected. Thus, the magnetic head drive circuit 66 drives the magnetic head 54 so as to apply modulation magnetic field corresponding to the recording data onto the magneto-optical disc 1.

Moreover, the system controller 57 carries out a memory control as described above with respect to the memory 64, and carries out control of recording position so as to successively record, onto recording tracks of the magneto-optical disc 1, the recording data read out in a burst manner from the memory 64 by the above-mentioned memory control. Such control of recording position is carried out by conducting management of recording position of the recording data read out in a burst manner from the memory 64 by the system controller 57 to deliver, to the servo control circuit 56, a signal to designate a recording position on the recording track of the magneto-optical disc 1.

The reproducing system of the magneto-optical disc recording/reproducing unit will now be described. This reproducing system is a system for reproducing recording data continuously recorded on recording tracks of the magneto-optical disc 1 by the above-described recording system, and includes a decoder 71 supplied with a reproduction output, which has been binarized by the RF circuit 55, obtained by tracing recording tracks of the magneto-optical disc 1 by laser beams by means of the optical head 53. At this time, it is possible to carry out read-out operation of not only the magneto-optical disc but also a reproduction only optical disc which is the same as compact disc (CD).

The decoder 71 corresponds to the encoder 65 in the above-described recording system, and serves to carry out, with respect to the binarized (binary) reproduction output by the RF circuit 55, processing such as decoding processing or EFM decoding processing as described above for error correction to reproduce audio data at a transfer rate (speed) of 75 sectors/sec. which is higher than the normal transfer rate (speed). The reproduction data obtained by the decoder 71 is delivered to a memory 72.

The memory 72 is adapted so that write and read operations of data are controlled by the system controller 57. Reproduction data delivered at the transfer rate of 75 sectors/sec. from the decoder 71 is written in a burst manner into the memory 72 at that transfer rate of 75 sectors/sec. Moreover, from the memory 72, the reproduction data which has been written in burst manner at the transfer rate of 75 sectors/sec. are continuously read out at a transfer rate of 18.75 sectors/sec. which is one fourth (¼) of the normal 75 sectors/sec. transfer rate.

The system controller 57 carries out such a memory control to write reproduction data into the memory 72 at the transfer rate of 75 sectors/sec., and to continuously read out the reproduction data at the transfer of 18.75 sectors/sec. from the memory 72. Moreover, the system controller 57 carries out a memory control as described above with respect to the memory 72, and carries out control of reproduction position so as to continuously reproduce, from recording tracks of the magneto-optical disc 1, the reproduction data read out in burst manner from the memory 72 by that memory control. Such control of reproduction position is conducted by carrying out management of reproduction position of the reproduction data read out in burst manner from the memory 72 by the system controller 57 to deliver, to the servo control circuit 56, a control signal to designate a reproduction position on recording tracks of the magneto-optical disc 1 or the optical disc 1.

ATC audio data obtained as reproduction data which has been continuously read out at the transfer rate of 18.75 sectors/sec. from the memory 72 is delivered to an ATC decoder 73. This ATC decoder 73 implements data expansion (bit expansion) to the ATC data so that the data quantity becomes quadruple to thereby reproduce digital audio data of 16 bits. The digital audio data from the ATC decoder 73 is delivered to a D/A converter The D/A converter 74 converts the digital audio data delivered from the ATC decoder 73 into an analog signal thus to form an analog audio output signal A OUT. The analog audio signal A OUT obtained by the D/A converter 74 is outputted from output terminal 76 through a low-pass filter Efficient compression encoding in the ATC encoder 63 will now be described in detail. Namely, explanation will be given with reference to FIG. 2 and figures succeeding thereto in connection with the technology for efficiently encoding an input digital signal such as an audio PCM signal, etc. by using respective technologies Sub Band Coding (SBC), Adaptive Transform Coding (ATC) and adaptive bit allocation.

Figure 2:
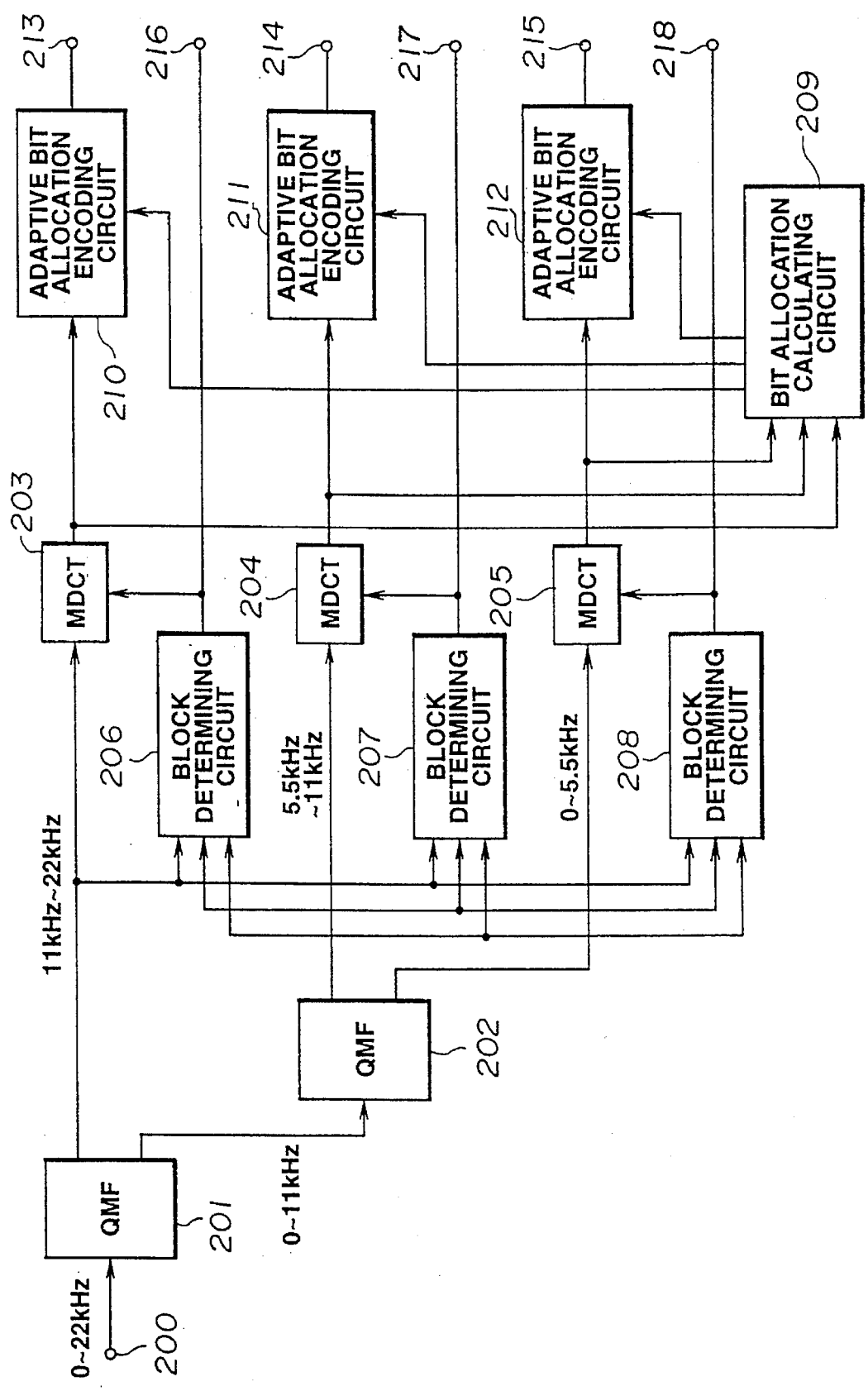
FIG. 2 is a block circuit diagram showing an actual example of an efficient compression encoding encoder which can be used for bit rate compression encoding of this embodiment.
Figure 3A:
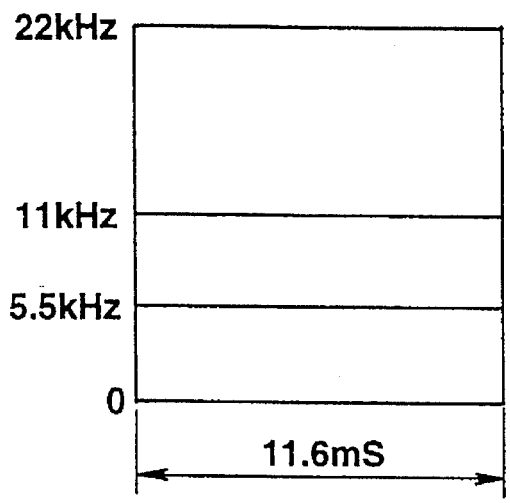
FIGS. 3(A)–3(D) are views showing the structure of orthogonal transform block in bit compression.
Figure 3B:
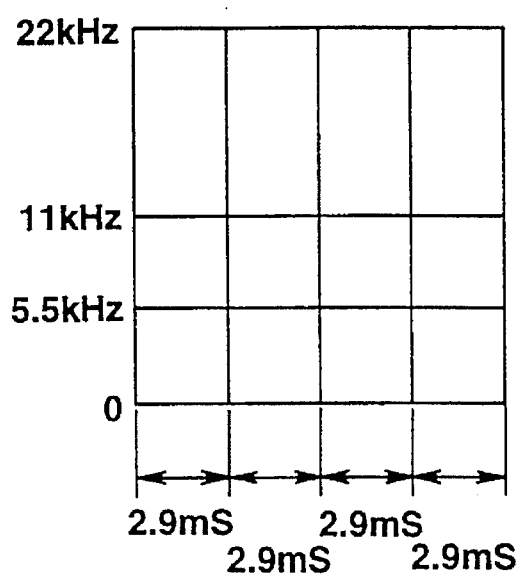
Figure 3C:
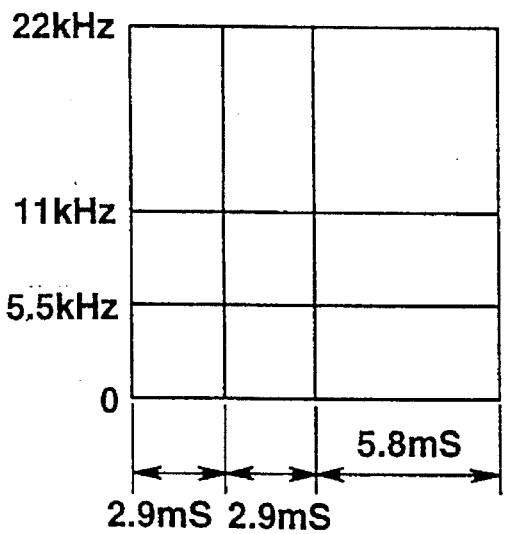
Figure 3D:
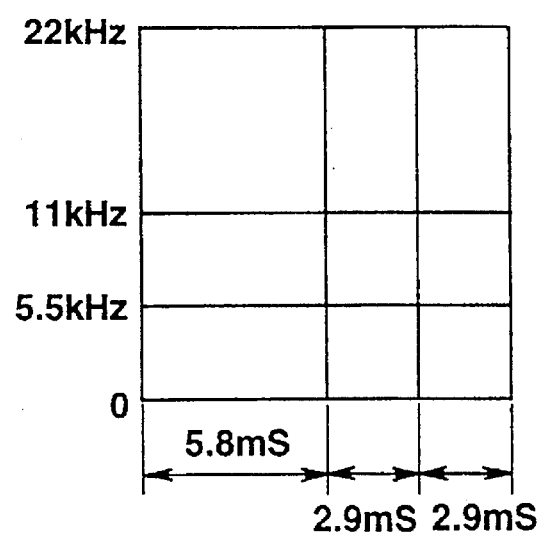

In the more practical efficient encoding unit (apparatus) shown in FIG. 2, an approach is employed to divide an input digital signal into signal components in a plurality of frequency bands, and to make a selection (setting) such that bandwidths of adjacent two bands of the lowest frequency band are equal to each other and bandwidths become broader in higher frequency bands according as frequency shifts to higher frequency band side to carry out orthogonal transform processing every respective frequency bands to adaptively carry out bit allocation of the spectrum data of the frequency base (axis) thus obtained, in lower frequency bands, every so called critical bands in which the hearing sense characteristic of the human being is taken into consideration, which will be described later and, in medium and higher frequency bands, every bands obtained by subdividing the critical bands width by taking block floating efficiency into consideration, thus to encode those data. Ordinarily, such blocks become quantizing noise generation blocks. Further, in the embodiment of this invention, prior to orthogonal transform processing, block sizes (block lengths) are adaptively varied in dependency upon an input signal, and floating processing are carried out in the block units.

Namely, in FIG. 2, input terminal 200 is supplied with an audio PCM signal of 0–22 kHz when sampling frequency is, e.g., 44.1 kHz. This input signal is divided into a signal in 0–11 kHz band and a signal in 11 kHz–22 kHz band by a band division filter 201, e.g., so called QMF filter, etc. The signal in the 0–11 kHz band is divided into a signal in a 0 kHz–5.5 kHz band and a signal in a 5.5 kHz–11 kHz band similarly by a band division filter 202 such as so called QMF filter, etc. The signal in the 11 kHz–22 kHz band from the band division filter 201 is sent to a MDCT circuit 203 which is an example of the orthogonal transform circuit, the signal in the 5.5 kHz–11 kHz band from the band division filter 202 is sent to a MDCT circuit 204, and the signal in the 0–5.5 kHz band from the band division filter 202 is sent to a MDCT circuit 205. Thus, those signals are respectively caused to undergo MDCT processing.

As a technique for dividing the above-described input digital signal into signals (signal components) in a plurality of frequency bands, there is, e.g., QMF filter, which is described in 1976 R. E. Crochiere Digital Coding of Speech In Subbands Bell Syst. Tech. J. Vol. 55, No. 8 1976. Moreover, a filter division technique of equal bandwidth is described in ICASSP 83, Boston Polyphase Quadrature Filters—A New Subband Coding Technique Joseph H. Rothweiler.

Further, as the above-described orthogonal transform processing, there is, e.g., such an orthogonal transform processing to divide an input audio signal into blocks every predetermined unit time (frame) to carry out, every respective blocks, Fast Fourier Transform (FFT), Discrete Cosine Transform (DCT), or Modified DCT (MDCT), etc. to transform signals on the time axis into signals on the frequency axis. The MDCT mentioned above is described in ICASSP 1987 Subband/Transform Coding Using Filter Designs Based On Time Domain Aliasing Cancellation J. P. Princen A. B. Bradley Univ. of Surrey Royal Melbourne Inst. Of Tech.

An actual example with respect to the standard input signal in connection with blocks every respective bands, which are delivered to respective MDCT circuits 203, 204, 205, is shown in FIG. 3. In the actual example of FIG. 3, three filter output signals respectively independently have, every respective bands, plural orthogonal transform block sizes, and time resolution can be switched by time characteristic and frequency distribution of signal, etc. In the case where a signal is in quasi-steady state, orthogonal transform block size is set to 11.6 ms, i.e., Long Mode of (A) in FIG. 3 is employed so that block size is greater (longer). On the other hand, in the case where a signal is in non steady state, orthogonal transform block size is further divided into two or four portions. In this case, an approach is employed in which block size is divided into four portions so that each has time resolution of 2.9 ms as in the case of Short Mode of (B) in FIG. 3, or one portion obtained by dividing block size into two portions so that it has time resolution of 5.8 ms and portions obtained by dividing block size into four portions so that they have time resolution of 2.9 ms as in the case of Middle Mode A of (C), Middle Mode B of (D) in FIG. 3, thus to become adaptive to actual complicated input signals. It is clear that with respect to division of the orthogonal transform block size, if scale of the processing unit is tolerable, implementation of further complicated division is more effective. Determination of the block size is carried out at block size determining circuits 206, 207, 208 in FIG. 2. The block sizes thus determined are sent to respective MDCT circuits 203, 204, 205, and are outputted from output terminals 216, 217, 218 as block size information of the corresponding blocks.

Figure 4:
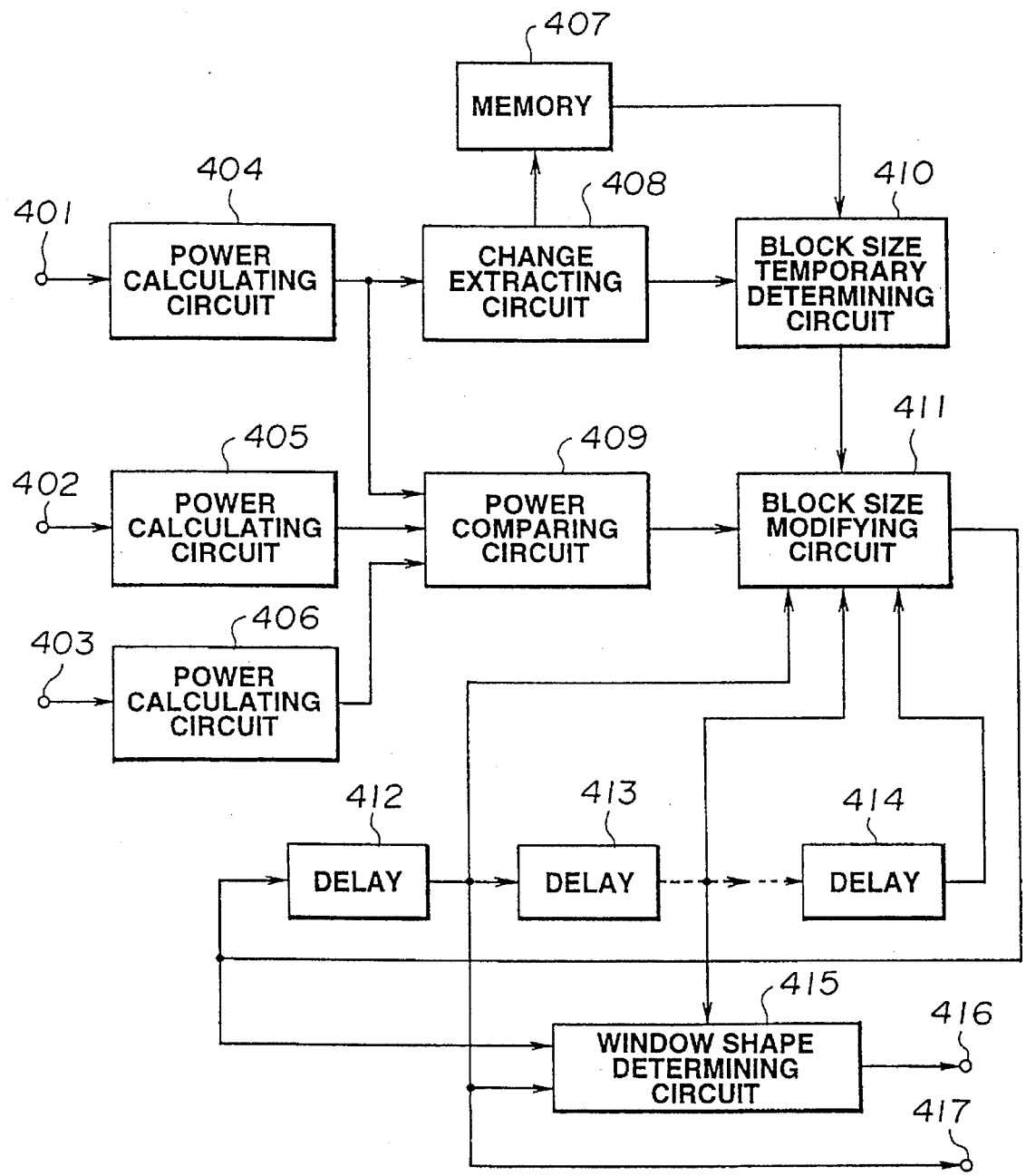
FIG. 4 is a block circuit diagram showing an example of the configuration of a circuit for determining orthogonal transform block size.

The detail of the block size determining circuit is shown in FIG. 4. Explanation will be given by taking an example of block determining circuit 206 in FIG. 2. An output of 11 kHz–22 kHz of outputs of QMF 201 is sent to a power calculating circuit 404 through an input terminal 401 in FIG. 4. Further, an output of 5.5 kHz–11 kHz of outputs of QMF 202 in FIG. 2 is sent to a power calculating circuit 405 through an input terminal 402 in FIG. 4, and an output of 0–5.5 kHz is sent to a power calculating circuit 406 through an input terminal 403 in FIG. 4. It is to be noted that block size determining circuits 207, 208 in FIG. 2 are the same in operation as the block size determining circuit 206 except that signals inputted to input terminals 401, 402, 403 in FIG. 4 are different from that in the case of the block size determining circuit 206. Respective input terminals 401, 402, 403 in the block size determining circuits 206, 207, 208 are caused to have matrix configuration. Namely, output of 5.5 kHz–11 kHz of QMF 202 in FIG. 2 is connected (sent) to the input terminal 401 of the block size determining circuit 207, and output of 0–5.5 kHz is connected (sent) to the input terminal 402 thereof. This similarly applies to the block size determining circuit 208.

In FIG. 4, respective power calculating circuits 404, 405, 406 integrate an inputted time waveform for a predetermined time to thereby determine (calculate) powers of respective frequency bands. In this instance, it is necessary that time width subject to integration is less than a minimum time block of the above-described orthogonal transform block sizes. Moreover, in addition to the above-described calculating method, if e.g., absolute value of the maximum amplitude or mean value of amplitudes within a minimum time width of the orthogonal transform block size is employed as a representative power, similar effect can be obtained. An output of the power calculating circuit 404 is sent to a change (value) extracting circuit 408 and a power comparing circuit 409, and outputs of power calculating circuits 405, 406 are both sent to the power comparing circuit 409. The change extracting circuit 408 determines differential coefficient of the power sent from the power calculating circuit 404 to send it, as change information of power, to a block size temporary determining circuit 410 and a memory 407. The memory 407 stores the power change information sent from the change extracting circuit 408 for a time period more than the maximum time of the above-described orthogonal transform block size. This is because since orthogonal transform blocks adjacent in point of time are affected each other by window (windowing) processing in orthogonal transform processing, power change information of a block preceding (backward) by one adjacent in point of time is required in the block size temporary determining circuit 410. The block size temporary determining circuit 410 determines, on the basis of power change information of a corresponding block sent from the change extracting circuit 408 and power change information of a block preceding (backward) by one of the corresponding block adjacent in point of time sent from the memory 407, an orthogonal block size of the corresponding frequency band from a displacement (shift) in point of time of a power within the corresponding frequency band. In this instance, in the case where a displacement (shift) of a predetermined level (value) or more is observed, a shorter orthogonal block size in point of time is selected. In this case, even if that point of displacement (shift) is fixed, effect can be obtained. Further, when determination is made such that displacement (shift) point becomes a value proportional to frequency, i.e., in the case where frequency is high, block size is caused to be a block size shorter in point of time by great displacement (shift), while in the case where frequency is low, block size is caused to be a block size shorter in point of time by displacement (shift) smaller than that in the case where frequency is high, more effective result is obtained. Although it is desirable that such value smoothly changes, stair-step shaped change of plural stages may be employed. The block size determined in a manner as described above is sent to a block size modifying circuit 411.

On the other hand, the power comparing circuit 409 makes comparison between power information of respective frequency bands sent from respective power calculating circuits 404, 405, 406 by time width generated by (based on) the simultaneous masking effect and the masking effect on the time base to determine influence of other frequency bands exerted on an output frequency band of the power calculating circuit 404 to send it to the block size modifying circuit 411. The block size modifying circuit 411 makes (applies) a modification, on the basis of masking information sent from the power comparing circuit 409 and past block size information sent from respective taps of a group of delays 412, 413, 414, so as to make a selection to allow the block size sent form the block size temporary determining circuit 410 to be a block size longer in point of time to output it to the delay 412 and a window shape determining circuit 415. Action (operation) in the block size modifying circuit 411 utilizes the characteristic that even in the case where pre-echo becomes problem in a corresponding frequency band, there are instances where when any signal having a large amplitude exists in other frequency bands, particularly frequency bands lower than the corresponding frequency band, pre-echo does not become problem from a viewpoint of the hearing sense or the problem by pre-echo is lessened by that masking effect. It should be noted that the masking refers to the phenomenon that a signal is masked by another signal by the characteristic from a viewpoint of the hearing sense of the human being so that it cannot be heard. For such masking effect, there are time axis masking effect by audio signal on the time axis and simultaneous masking effect by signal on the frequency axis. By these masking effects, even if any noise exists at the portion subjected to masking, such noise would not be heard. For this reason, in actual audio signals, noise within the range subjected to masking is considered to be allowable noise.

The group of delays 412, 413, 414 record past orthogonal transform block sizes in order to output them to the block size determining circuit 411 from respective taps, i.e., outputs (output terminals) of the group of delays 412, 413, 414. At the same time, an output (terminal) of the delay 412 is connected to an output terminal 417, and outputs (output terminals) of the group of delays are connected to the window shape determining circuit 415. Outputs from the group of delays 412, 413, 414 permit judgment of how change of block size at a longer time width is caused to serve to determine block size of a corresponding block in the block size modifying circuit 411, for example, such that the degree of selection of block sizes shorter in point of time is increased when block sizes short in point of time are frequently selected in the past, and the degree of selection of block sizes longer in point of time is increased when no selection of block size shorter in point of time is made in the past, etc. It is to be noted that there are instances where, except for delays 412, 413 required for window shape determining circuit 415 and output terminal 417, the group of delays may be used with the number of taps thereof being increased or decreased in dependency upon actual configuration or scale of the apparatus. The window shape determining circuit 415 determines, from an output of the block size modifying circuit 411, i.e., a block size succeeding (forward) by one adjacent in point of time of a corresponding block, an output of the delay 412, i.e., block size of the corresponding block, an output of the delay 413, i.e., a block size preceding (backward) by one adjacent in point of time of the corresponding block, shapes of windows used in the respective MDCT circuits 203, 204, 205 in the FIG. 2 mentioned above to output them to the output terminal 416. Output terminal 417 in FIG. 4, i.e., block size information and output terminal 416, i.e., window shape information are connected (sent) to respective components as outputs of the block size determining circuits 206, 207, 208 in FIG. 2.

Figure 5A:
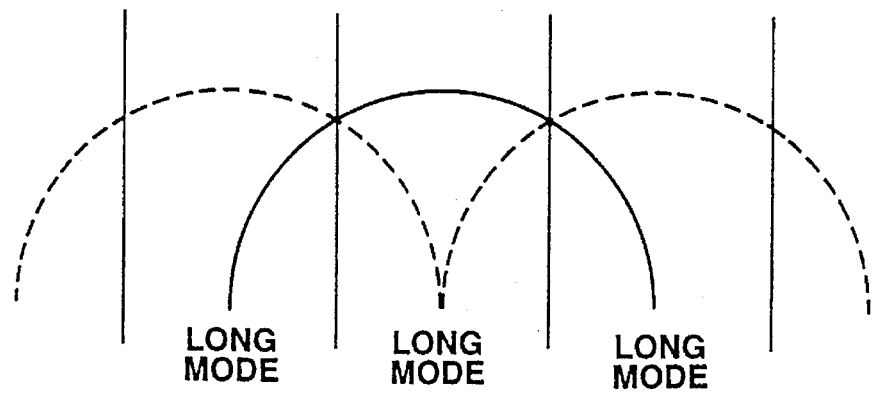
FIGS. 5(A)–5(C) are views showing the relationship between change of length in point of time of orthogonal transform blocks adjacent in point of time and window shape used at the time of orthogonal transform processing.
Figure 5B:
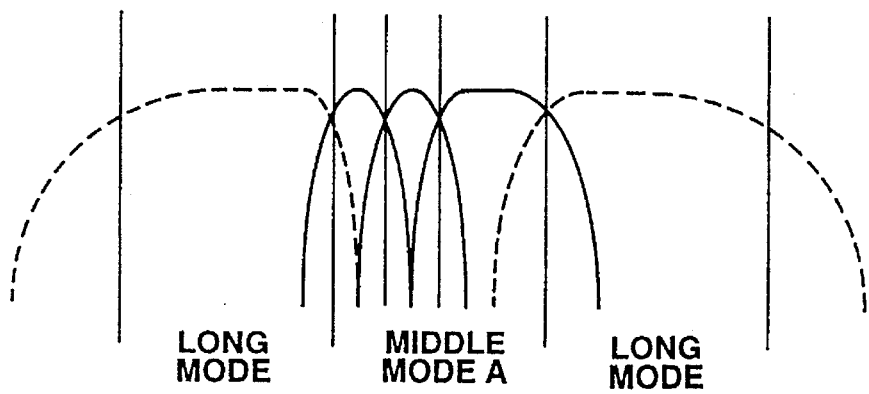
Figure 5C:
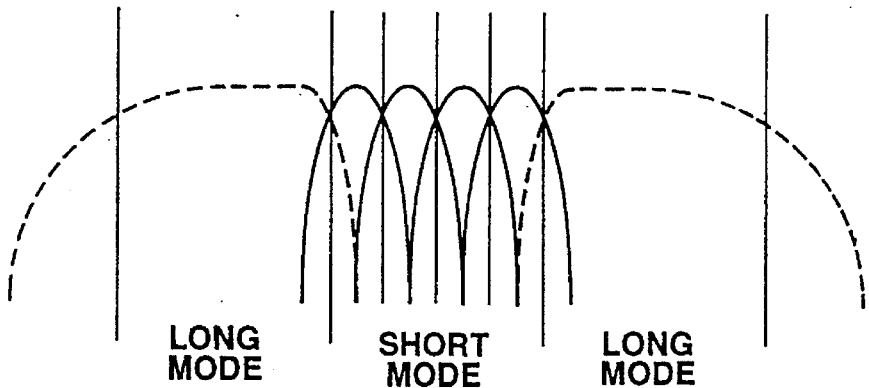

Shape of window determined in the window shape determining circuit 415 will now be described. The state of adjacent blocks and shape of window is shown in FIG. 5. As seen from a~c of FIG. 5, windows used for orthogonal transform processing have portions overlapping with blocks adjacent in point of time as indicated by dotted lines and solid line(s) in the figure. Since there is employed in this embodiment shape overlapping up to the center of the adjacent block, shape of window changes in dependency upon orthogonal transform size of the adjacent block.

Figure 6:
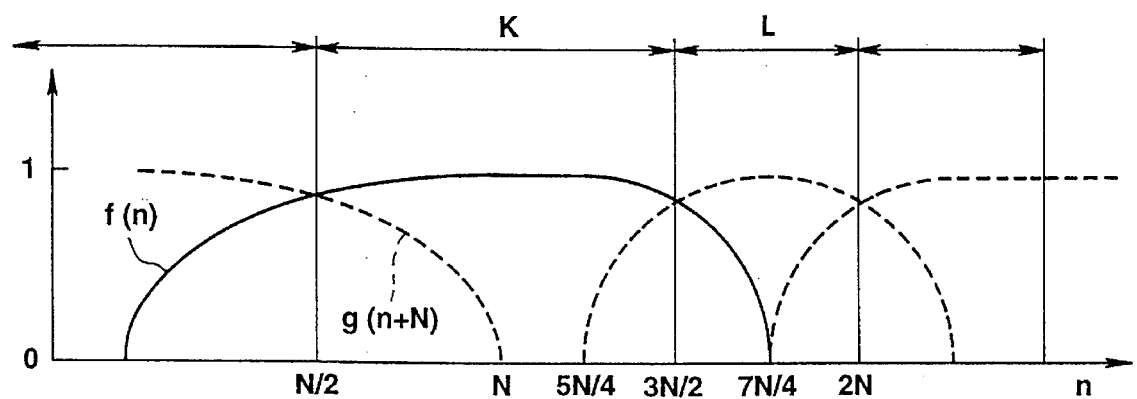
FIG. 6 is a view showing an example of the detail of shape of window used at the time of orthogonal transform processing.

Detail of the window shape is shown in FIG. 6. In FIG. 6, window functions f(n), g(n+N) are given by functions which satisfy the following formula:

$$f(n) \times f(L-1-n) = g(n) \times g(L-1-n)$$

$$f(n) \times f(n) + g(n) \times g(n) = 1 \quad (1)$$
$$0 \leq n \leq L-1$$

L in the above-mentioned formula (1) is considered to be a transform block length as it is if adjacent transform block lengths are the same. However, in the case where adjacent transform block lengths are different, when it is assumed that a shorter transform block length is caused to be L and a longer transform block length is caused to be K, window functions are given by the following formula (2) in the area where windows do not overlap:

$$f(n) = g(n) = 1 \quad K \leq n \leq 3K/2 - L/2$$

$$f(n) = g(n) = 0 \quad 3K/2 + Ln2K \quad (2)$$

By allowing overlapping portion of window to be as long as possible in this way, frequency resolution of spectrum in orthogonal transform processing is caused to be satisfactory. As is clear from the foregoing description, after orthogonal transform sizes of three blocks continuous in point of time are established, shape of window used for orthogonal transform processing is determined. Accordingly, in this embodiment, there occur differences corresponding one block between blocks of signal inputted from the input terminals 401, 402, 403 in FIG. 4 and blocks of signal outputted from the output terminals 416 and 417.

Moreover, even if power calculating circuits 405, 406 and power comparing circuit 409 in FIG. 4 are omitted, block size determining circuits 206, 207, 208 in FIG. 2 may be constituted. Further, there may be employed a configuration such that shape of window is fixed to a block size minimum in point of time that orthogonal transform block can take to thereby the kind thereof to be one so that group of delays 412, 413, 414, block size modifying circuit 411 and window shape determining circuit in FIG. 4 are omitted. Particularly in applications where delay of processing time is not preferable, there is provided a configuration having lesser delay by the above-described omission, and such omission of circuit configuration is advantageous.

In FIG. 2, for a second time, spectrum data or MDCT coefficient data obtained after undergone MDCT processing at respective MDCT circuits 203, 204, 205 are sent to adaptive bit allocation encoding circuits 210, 211, 213 and a bit allocation calculating circuit 209 in such a manner that, in lower frequency bands, those data are combined every block floating units in which so called critical bands are caused to be unit with respect to the frequency axis direction and the block size is caused be unit with respect to the time axis direction; and in medium and higher frequency bands, those data are combined every block floating units in which bands obtained by subdividing critical bandwidth are caused to be unit with respect to the frequency axis direction and the block size is caused to be unit with respect to the time axis direction. Such critical bands are frequency bands divided by taking the hearing sense characteristic of the human being, and are defined as bands that narrow band noises having the same intensity in the vicinity of frequency of a certain pure sound have when the pure sound is masked by those band noises. Such critical bands are such that according as frequency shifts to higher frequency bands, bandwidths become broader, and the entire frequency band of 0~22 kHz are divided into, e.g., 25 critical bands.

The bit allocation calculating circuit 209 determines, on the basis of spectrum data divided into the block floating units, masking quantities of blocking floating units by taking so called masking, etc. into consideration to determine, on the basis of the masking quantities and energies or peaks, etc. of block floating units, allocated bit allocation ratios every respective block floating units to send them to the adaptive bit allocation encoding circuits 210, 211, 212. These adaptive bit allocation encoding circuits 210, 211, 212 carry out normalization by using scale factors (e.g., maximum value of absolute values of respective components within a corresponding unit) every respective block floating units, and calculates, from bit allocation ratios allocated every respective block floating units and total number of usable bits, the numbers of bits which can be actually allocated to respective block floating units, thus to quantize respective spectrum data (or MDCT coefficient data) in accordance with the calculated numbers of bits. Data encoded in this way are taken out through output terminals 213, 214, 215. In this case, the scale factor and a word length indicating quantization bit number are also outputted through the output terminals 213, 214, 215.

The operation of the bit allocation calculating circuit 209 which is the important point of this invention will now be described with reference to FIG. 7. Respective outputs of MDCT circuit 203, 204, 205 in FIG. 2 are connected (sent) to input terminal 700 in FIG. 7, and are inputted to a peak component extracting circuit 701 and a circuit 702 for calculating energy every band. The peak component extracting circuit 701 implements sequencing to MDCT coefficients within respective block floating units so that they are allocated in order of magnitude of absolute values of those MDCT coefficients to extract components (also including one component) in order of magnitude in dependency upon bandwidth of a corresponding block floating unit to output, to a subtracter 703 and a difference calculating element (circuit) 704, a value (energy of peak component) obtained by square sum of extracted components by total number of all frequency components within the corresponding block floating unit.

Moreover, the circuit 702 for calculating energy every band determines mean square of MDCT coefficients every block floating unit to thereby calculate an energy within a corresponding block floating unit to output it to the subtracter 703. In this instance, if simple mean is determined in place of mean square, similar effect can be obtained. (At this time, it should be noted that output of the peak component extracting circuit 701 is also required to be a value obtained by dividing sum of extracted components by total number of all frequency components within the corresponding block floating unit.)

Then, the subtracter 703 subtracts outputs of the peak component extracting circuit 701 from an output of the circuit 702 for calculating energy every band to output it to the difference calculating circuit 704. Namely, by this calculation, energies except for peak components of respective block floating units are calculated.

The difference calculating circuit 704 calculates a difference (at each time point) between energy except for the peak component(s) and the energy of the peak component(s) to output it to a peak component dependent bit allocation determining circuit 705. While, in this embodiment, calculation of difference is performed by carrying out in advance conversion into integer of decimal number (conversion into ID) by the logarithmic axis to calculate differences by ID, it is clear that if calculation is performed by real number, similar effect can be obtained.

The peak component dependent bit allocation circuit 705 determines bit allocation ratio dependent upon peak component on the basis of difference data outputted from the difference calculating circuit 704. In this embodiment, there are prepared a plurality of patterns depending upon frequency, frequency width of block floating unit and energy of peak, e.g., patterns such that a greater number of bits are allocated to a signal of a greater magnitude to carry out determination of bit allocation ratio by table.

The effect of bit allocation dependent upon peak component will now be described with reference to FIG. 8.

Figure 8A:
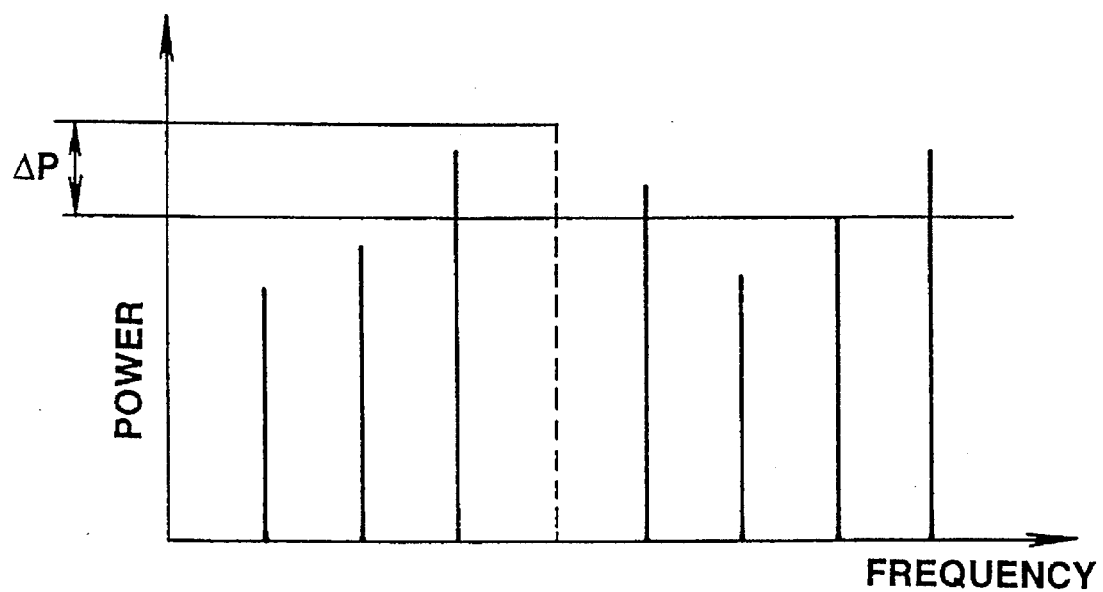
FIGS. 8(A)–8(B) are views showing effect of peak component dependent bit allocation.
Figure 8B:
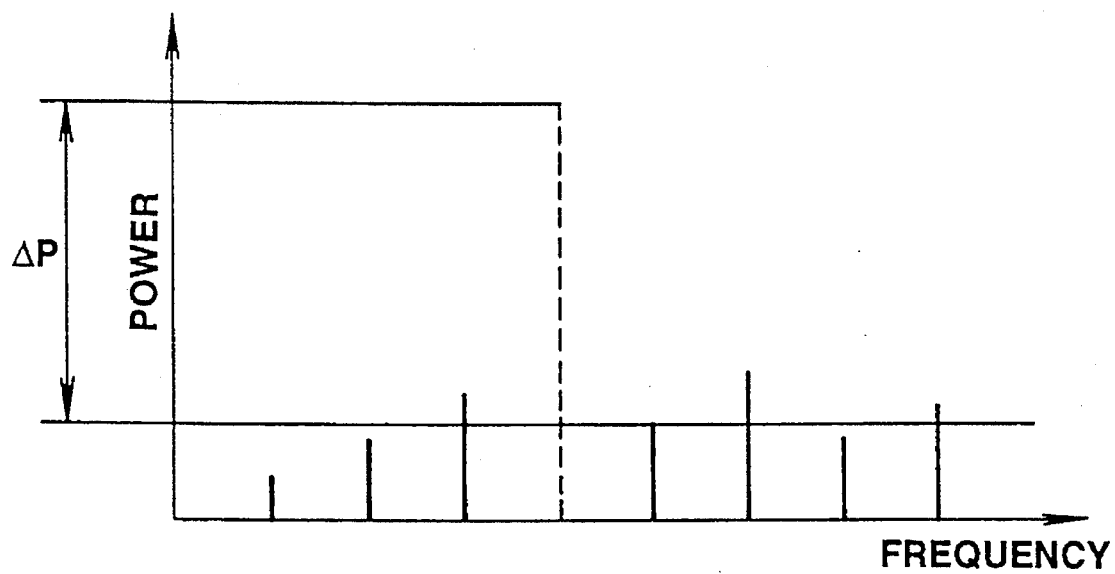

When consideration is made in connection with allocation of bits dependent upon power or energy within the block floating unit, in the case where attention is drawn to power or energy of peak within the block floating unit, (a), (b) in FIG. 8 are judged to have the same power or energy, so substantially the same bits are allocated. On the other hand, when attention is drawn to total energy or mean energy within the block floating unit, a greater number of bits are allocated in the case of (a) in FIG. 8. However, as compared to the case of (b) in FIG. 8, in the case of (a) in FIG. 8, power spectrum is clearly noise-shaped. Therefore, masking effect in the case of (a) is considered to be higher. Accordingly, there occur instances where employment of bit allocation in which a greater number of bits are rather allocated in the case of (b) in FIG. 8 provides satisfactory result. In this embodiment, ΔP in FIG. 8 (corresponding to output of the difference calculating circuit 704) is calculated to allow it to be included in the bit allocation to thereby obtain satisfactory result. This is based on an auditory sense characteristic such that while the range where the masking effect is exerted in the case where sound to be masked is pure sound and that in the case where sound to be masked is noise are nearly equal to each other, the masking effect in the case of noise is higher because beat by two pure sounds does not take place.

Figure 7:
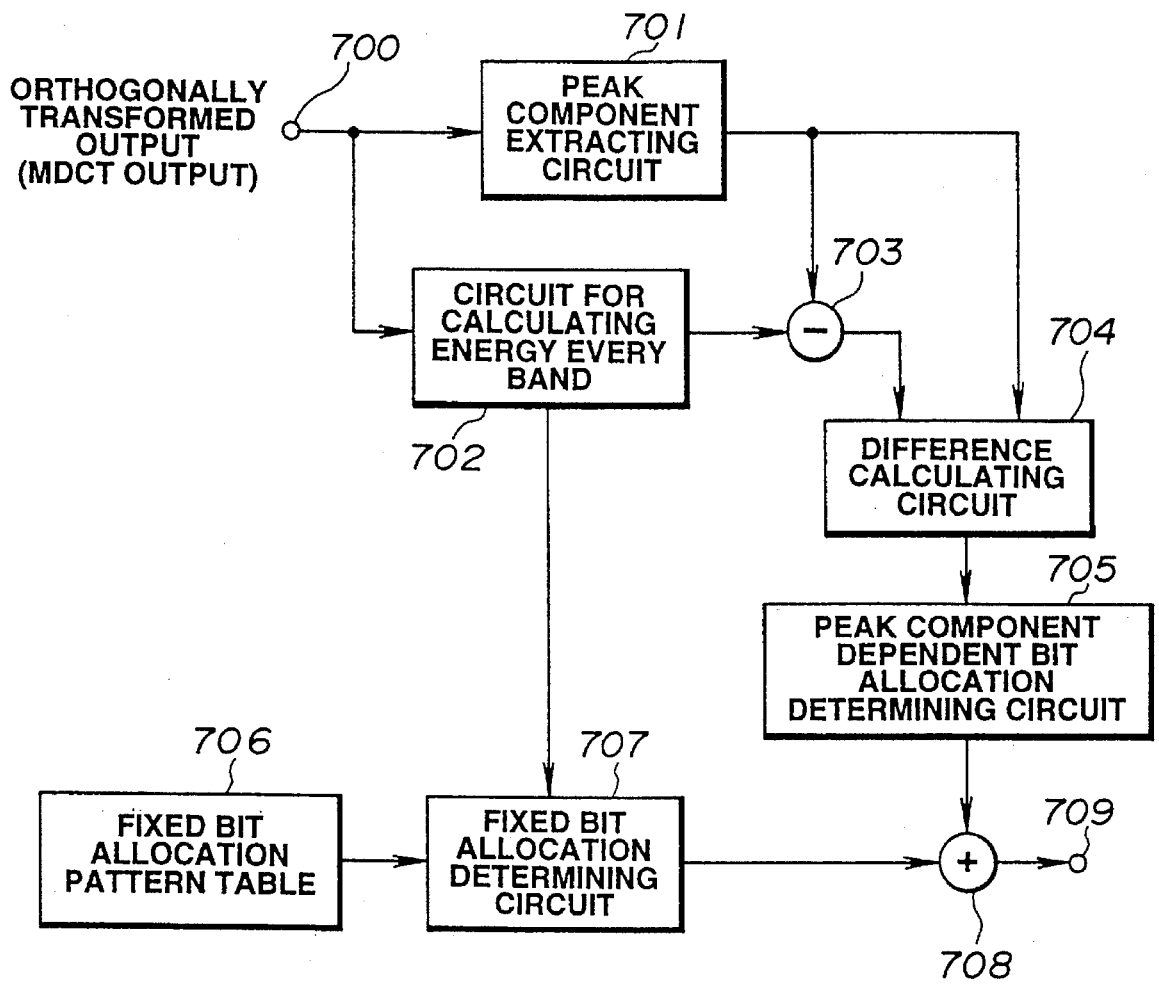
FIG. 7 is a block circuit diagram showing an example of an adaptive bit allocation circuit for realizing bit allocation operation (calculating) function.

In FIG. 7, for a second time, in a fixed bit allocation determining circuit 707, a fixed bit allocation ratio is determined from an output of the circuit 702 for calculating energy every band and a fixed bit allocation pattern table 708. For the fixed bit allocation pattern table 708 for determining fixed bit allocation ratio, a plurality of tables are prepared. Accordingly, it is possible to carry out various selections in dependency upon the property of signal. In the embodiment, there are provided various patterns in which bit quantities of blocks of shorter time corresponding to a block subject to processing are distributed with respect to respective frequencies to select an arbitrary one of them by an output of the circuit 702 for calculating energy every band. Particularly, in this embodiment, there are prepared a plurality of patterns in which bit allocation ratio in lower and medium frequency bands and that in higher frequency band are caused to differ from each other with respect to a single sum total value of energies over the frequency band. Further, there is employed an approach in which according as magnitude of sum total value over the all frequency bands of output of the circuit 702 for calculating energy every band becomes smaller, a pattern of a lesser allocated quantity to higher frequency band is selected. Thus, the loudness effect that according as magnitude of a signal becomes smaller, sensitivity of the high frequency band is lowered to more degree is exhibited, thus to obtain satisfactory effect. Moreover, while, in this embodiment, selection of fixed bit allocation pattern table 706 is carried out by calculating energies every bands, an output of non-blocking frequency dividing circuit where filters, etc. are used or MDCT output may be utilized for this purpose.

The fixed bit allocation ratio determined in this way and the peak dependent bit allocation ratio are added by an adder 708. An added output is outputted from output terminal 709 to the adaptive bit allocation encoding circuits 210, 211, 212 in FIG. 2.

Figure 9A:
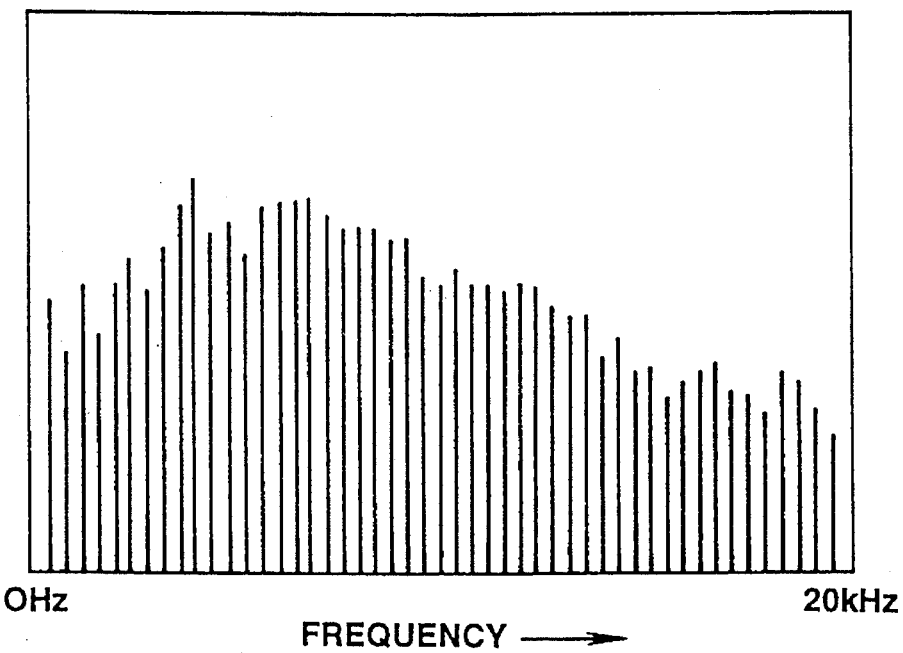
FIGS. 9(A)–9(B) are views showing bit allocation when a signal having a relatively flat and noise shaped spectrum (waveform) is inputted.
Figure 9B:
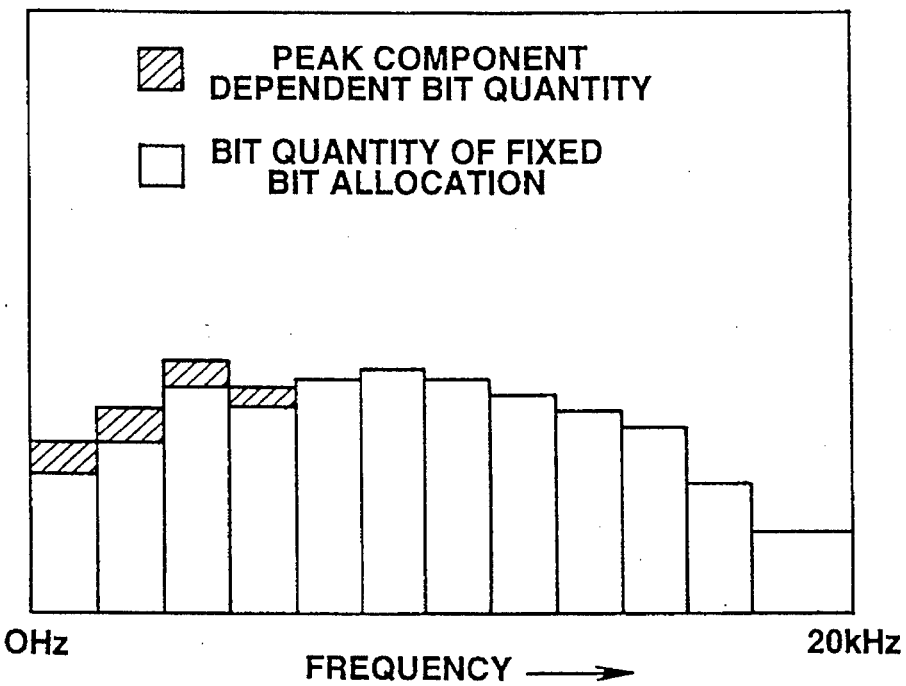
Figure 10A:
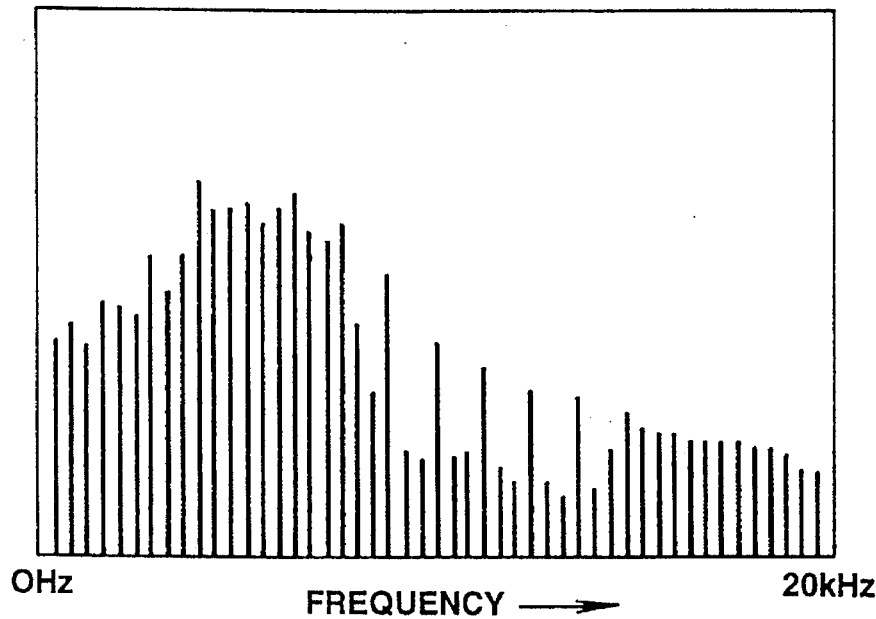
FIGS. 10(A)–10(B) are views showing bit allocation when a signal having peak component is inputted.
Figure 10B:
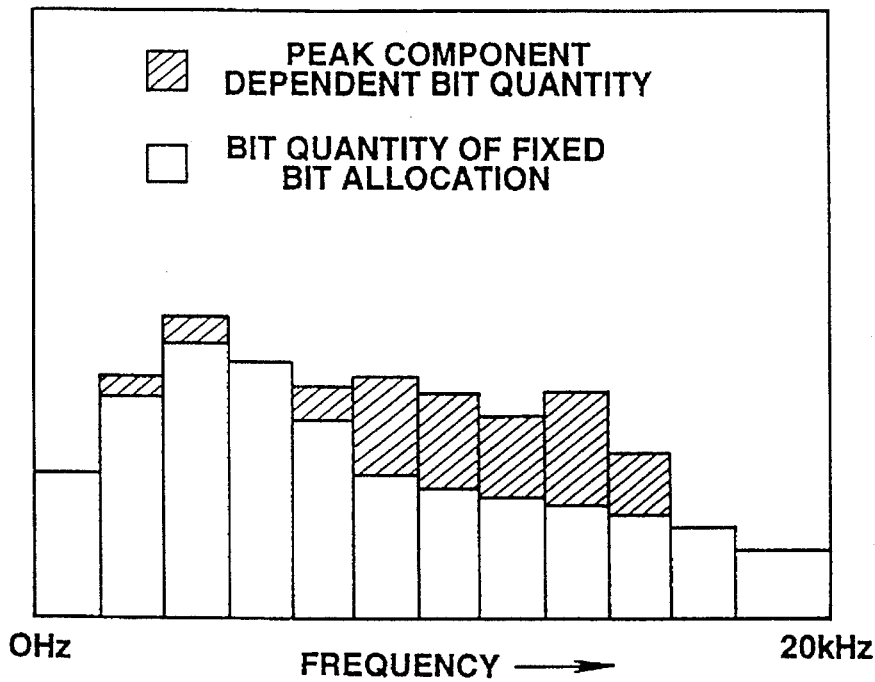

The state of the above-described bit allocation is shown in FIGS. 9(b) and 10(b), and the state of MDCT coefficients of an inputted signal with respect thereto are shown in FIGS. 9(a) and 10(a). In FIGS. 9, 10, for the brevity of explanation, allocation of bits is represented on the assumption that the entire frequency band is divided into 12 block floating units.

FIG. 9 shows the case where spectrum of a signal is flat and noise-shaped, and bit allocation by a greater quantity of fixed allocation bits is benefit for taking large signal-to-noise ratios over the entire bands. In this embodiment, an approach is employed such that bits are allocated in a form depending upon powers of respective block floating units and a greater number of bits are allocated by allocation inclined (weighted) to the lower frequency side. Accordingly, while the signal noise characteristic at the higher frequency band side is deteriorated, the signal noise characteristic at the lower frequency band side is improved. Since noises at the higher frequency side generated by employment of such an approach are difficult to be heard as compared to noises at the lower frequency side when primarily viewed from dependency with respect to frequency of the sensitivity of the ear of the human being, and such noises are masked by signal at the lower frequency band side, big problem does not result from a viewpoint of the hearing sense.

Further, the state of bit allocation in the case where a signal having a spectrum shown in FIG. 10(a) is inputted is shown in FIG. 10(b), wherein rectangle of white indicates the number of bits allocated to respective blocks on the basis of fixed pattern, and rectangle to which slanting lines are implemented indicates the number of bits allocated on the basis of magnitudes of signal components of respective block floating units. The number of bits corresponding to sum of the above-mentioned numbers of bits are allocated to respective block floating units. It is to be noted that while these numeric values are indicated so as to take real number values in place of integer values, this indicates process of calculation, and e.g., an approach may be ultimately employed to round off these values to thereby determine allocated bit numbers with respect to respective block floating units. Similarly to the case of FIG. 9, fixed bit allocation is carried out by inclination allocation by powers and frequencies of respective block floating units. Moreover, with respect to the fifth to the tenth bands, since respective block floating units have large peak components therein, allocation of bits dependent upon the peak component is carried out to more degree. In actual signals, spectrum as described above is observed in a rectangular wave in the case of an artificial signal, and in wave form of wind instruments, etc. in which overtone component is produced without attenuating up to relatively higher frequency band.

The noticeable point is that, in the case of the method of this invention, while bits lesser than that of the fourth block floating unit are allocated to, e.g., the ninth block floating unit, a greater number of bits are allocated as compared to the number of bits allocated to, e.g., the eighth block floating unit, etc. Such a bit allocation cannot be realized by carrying out bit allocation using a technique such as weighting, etc. depending upon magnitudes of signals within respective block floating units and corresponding to frequencies, but can be realized by determining allocation of bits by drawing attention to peak components and other components within respective block floating units.

In this embodiment, it is assumed that, in lower frequency bands less than 100 Hz, as spectrum (components) obtained as the result of MDCT, only several spectrum components can be obtained at the maximum. In such a case, since, in respective spectrum components on the lower frequency side obtained by calculation, such signals to correspond to frequencies of bands higher than those lower frequency bands are mixed to much degree, it is necessary to allocate sufficiently greater number of bits to the lower frequency band side. For this reason, speaking approximately, with respect to bits allocated on the basis of magnitudes of signal components of respective block floating units, many bits may be allocated according as frequency shifts to lower frequency side. However, if a time period during which spectrum is obtained is caused to be longer so that an efficient encoding apparatus capable of sufficiently densely obtaining spectrum less than 100 Hz is employed, allocation of bits dependent upon magnitude of a signal with respect to spectrum corresponding to, e.g., less than 50 Hz where the sensitivity of the ear of the human being is low may be lesser (lower) than allocation of bits with respect to signal components of bands higher than that.

In a system as explained above, data obtained by allowing orthogonally transformed output spectrum to undergo processing (normalization and quantization) is obtained as main information, and scale factor indicating the state of block floating and word length are obtained as sub information, and those data are sent from encoder to decoder.

Figure 11:
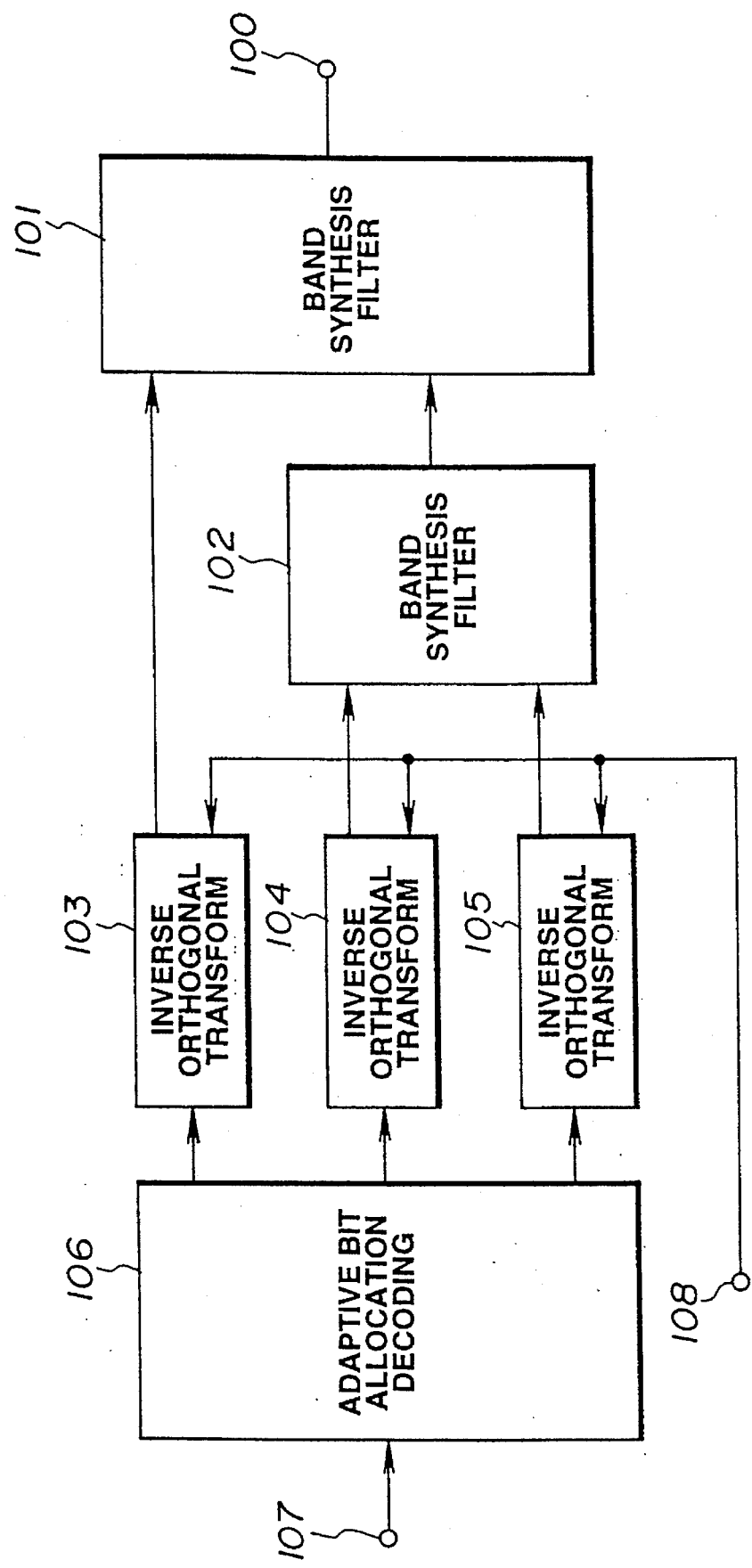
FIG. 11 is a block circuit diagram showing an actual example of an efficient compression encoding decoder which can be used for bit rate compression encoding of the embodiment.

FIG. 11 shows ATC decoder 73 in FIG. 1, i.e., a decoding circuit for decoding, for a second time a signal which has been caused to undergo efficient encoding. Quantized MDCT coefficients of respective bands, i.e., data equivalent to output signals of output terminals 213, 214, 215 in FIG. 2 are delivered to a decoding circuit input 107, and used block size information, i.e., data equivalent to output signals of output terminals 216, 217, 218 in FIG. 2 are delivered to an input terminal 108. An adaptive bit allocation decoding circuit 106 carries out inverse quantization and normalization by using scale factor and word length. Then, at inverse orthogonal transform (IMDCT) circuits 103, 104, 105, signals on the frequency base are transformed into signals on the time base. The signals on the time base of these partial bands are decoded into the entire band signal by band synthesis filter (IQMF) circuits 102, 101.

It is to be noted that this invention is not limited to the above-described embodiment, and, e.g., it is not necessary that the above-mentioned recording/reproducing medium and the signal compressing or expanding unit, and the signal compressing unit and the signal expanding unit are integrated, and an approach may be employed to connect between those units by data transfer line or optical cable, or communication by light or radio wave, etc. without allowing a recording medium as described above to intervene therebetween. Further, e.g., this invention may be applied not only to audio PCM signal but also to processing apparatus for signal such as digital speech signal or digital video signal, etc.

Moreover, the data recording medium of this invention records data compressed by the above-mentioned digital signal processing apparatus, thereby making it possible to effectively utilize recording capacity. In addition, as the data recording medium of this invention, not only the above-described optical disc but also various recording media such as magnetic disc, IC memory, card including that memory therein, or magnetic tape, etc. may be employed.

INDUSTRIAL APPLICABILITY

As is clear from the foregoing description, this invention employs a scheme to extract, from components within a plurality of blocks obtained by subdividing an input signal with respect to time and frequency, every respective blocks, a component or plural components in order of magnitude of components within each of the blocks to determine, on the basis of a difference between magnitudes of components of respective blocks except for the extracted components and magnitudes of the extracted components, bit allocation ratio to the respective blocks to quantize components of the respective blocks on the basis of the bit allocation ratio, thus to generate compressed data, thereby making it possible to realize a technique of allocation of bits desirable also from a viewpoint of the auditory sense with respect to such an input signal including, e.g., overtone to much degree. Accordingly, it is possible to carry out efficient compression/ expansion of high sound quality from a view point of the hearing sense. In addition, the data recording medium adapted for recording therein data compressed by the digital signal processing apparatus of this invention can more effectively utilize memory capacity as compared to the conventional data recording medium.

What is claimed is:

1. A digital signal processing apparatus adapted for compressing a digital signal to record or transmit it, the apparatus comprising:

extracting means for extracting, from components within a plurality of blocks obtained by subdividing an input signal with respect to time and frequency, every respective blocks, a component or plural components in order of magnitude of signal components within each of the blocks;

bit allocating means for determining, on the basis of a difference between magnitudes of respective blocks except for the extracted components and magnitudes of the extracted components, a bit allocation ratio to the respective blocks; and encoding means for quantizing components of the respective blocks on the basis of the bit allocation ratio to generate compressed data.

2. A digital signal processing apparatus as set forth in claim 1, wherein the encoding means normalizes components within the respective blocks by representative values within the respective blocks.

3. A digital signal processing apparatus as set forth in claim 1, wherein the bit allocating means further determines the bit allocation ratio on the basis of magnitudes of components within the respective blocks and so that weighting is carried out in accordance with corresponding bands of the respective blocks.

4. A digital signal processing apparatus as set forth in claim 1, wherein the extracting means switches the number of the extracted components in accordance with corresponding bands of the respective blocks.

5. A digital signal processing method of compressing a digital signal to record or transmit it, the method comprising the steps of:

extracting, from components within a plurality of blocks obtained by subdividing an input signal with respect to time and frequency, every respective blocks, a component or plural components in order of magnitude of components within the respective blocks;

determining, on the basis of a difference between magnitudes of components of respective blocks except for the extracted components and magnitudes of the extracted components, a bit allocation ratio to the respective blocks; and quantizing components of the respective blocks on the basis of the bit allocation ratio to generate compressed data.

6. A digital signal processing method as set forth in claim 5, wherein the method further includes a step of normalizing components within the respective blocks by representative values within the respective blocks.

7. A digital signal processing method as set forth in claim 5, wherein the method includes a step of determining the bit allocation ratio on the basis of magnitudes of components of the respective blocks and so that weighting is carried out in accordance with corresponding bands of the respective blocks.

8. A signal processing method as set forth in claim 5, wherein the number of the extracted components is switched in accordance with corresponding bands of the respective blocks.

9. A data recording medium adapted so that compressed data are recorded therein, wherein the data recording medium is formed by the steps of:

extracting, from a plurality of blocks obtained by subdividing an input signal with respect to time and frequency, every respective blocks, a component or plural components in order of magnitude of components within the respective blocks;

determining a bit allocation ratio to the respective blocks on the basis of a difference between magnitudes of components of the respective blocks except for the extracted components and magnitudes of the extracted components; quantizing components of the respective blocks on the basis of the bit allocation ratio to generate compressed data; and recording the compressed data onto or into the recording medium.

10. A data recording medium as set forth in claim 9, wherein the data recording medium is formed by further including a step of normalizing components within the respective blocks by representative values within the respective blocks.

11. A data recording medium as set forth in claim 9, wherein the data recording medium is formed by further including a step of determining the bit allocation ratio on the basis of magnitudes of components of the respective blocks and so that weighting is carried out in accordance with corresponding bands of the respective blocks.

12. A data recording medium as set forth in claim 9, wherein the data recording medium is formed by further including a step of switching the number of extracted components.

* * * * *